(12) United States Patent
Wurster et al.

(10) Patent No.: US 8,593,690 B2
(45) Date of Patent: Nov. 26, 2013

(54) METHOD FOR MAKING OVERPRINT PREDICTIONS

(75) Inventors: Jürgen Wurster, Dettenhausen (DE); Johannes Hoffstadt, Ulm (DE)

(73) Assignee: GMG GmbH & Co. KG (DE)

( * ) Notice: Subject to any disclaimer, the term of this patent is extended or adjusted under 35 U.S.C. 154(b) by 279 days.

(21) Appl. No.: 13/092,479

(22) Filed: Apr. 22, 2011

(65) Prior Publication Data

US 2012/0099157 A1 Apr. 26, 2012

(30) Foreign Application Priority Data

Apr. 23, 2010 (EP) .................................. 10004328

(51) Int. Cl.
*H04N 1/40* (2006.01)
(52) U.S. Cl.
USPC .............................. 358/3.01; 358/1.9; 702/81
(58) Field of Classification Search
USPC ..................... 358/3.01, 1.9; 702/81
See application file for complete search history.

(56) References Cited

U.S. PATENT DOCUMENTS

| | | | |
|---|---|---|---|
| 5,933,578 A * | 8/1999 | Van de Capelle et al. | 358/1.9 |
| 7,423,778 B2 | 9/2008 | Hersch et al. | |
| 2002/0193956 A1 * | 12/2002 | Van de Capelle et al. | 702/81 |
| 2003/0065491 A1 * | 4/2003 | Roberts | 703/2 |
| 2003/0123072 A1 * | 7/2003 | Spronk | 358/1.9 |
| 2004/0056867 A1 | 3/2004 | Cui et al. | |
| 2005/0036163 A1 * | 2/2005 | Edge | 358/1.9 |
| 2005/0094209 A1 | 5/2005 | Hasler et al. | |
| 2006/0007252 A1 | 1/2006 | Mahy et al. | |
| 2006/0262364 A1 * | 11/2006 | Edge | 358/518 |

FOREIGN PATENT DOCUMENTS

| | | |
|---|---|---|
| EP | 1 768 381 | 3/2007 |
| WO | 98/46008 | 10/1998 |

OTHER PUBLICATIONS

Translation of International Preliminary Report on Patentability for PCT/EP2007/001308 (Oct. 21, 2008).
Braun, K., et al.: "Development and Evaluation of Six Gamut-Mapping Algorithms for Pictorial Images", Proceedings of the 7th IS&T/SID Color Imaging Conference, Nov. 16, 1999, pp. 144-148, XP008078678, p. 145: "L* compression (followed by Nearest-Point Clipping)" (in English).

(Continued)

*Primary Examiner* — Twyler Haskins
*Assistant Examiner* — Michael Burleson
(74) *Attorney, Agent, or Firm* — Harness, Dickey & Pierce, P.L.C.

(57) ABSTRACT

To improve a method for making an overprint prediction to that extent, that the method allows more reliable overprint predictions with a reduced effort, the invention proposes a method for making the overprint prediction for a color combination, in which method a printing substrate and at least two printing colors and one gradation of hue values per printing color including the full tone as well as color combinations are predefined as data of the hue value of the n printing colors, wherein first of all individual color predictions comprising three transmittance components and the associated transmittance spectra for the respective hue value are determined for each of the n printing colors, wherein for an intended color combination up to (3 to the power of n) combinations of the transmittance components and the associated combined transmittance spectra are determined, and an overall reflectance spectrum of an overprint is predicted on the basis of the determined transmittance components with their transmittance spectra and the reflectance spectrum of the unprinted substrate.

13 Claims, 6 Drawing Sheets

(56) References Cited

OTHER PUBLICATIONS

Braun, G., et al.: "Gamut Mapping for Pictorial Images", TAGA Proceedings, 1999, pp. 645-660, XP008078676, pp. 646-652 (in English) (undated).

Hersch R D, et al: "Spectral reflection and dot surface prediction models for color halftone prints", Journal of Electronic Imaging, Bd. 14, Nr. 3, 033001, Jul. 2005, Seiten 1-12, XP002601998 SPIE-INT, Soc. Opt. Eng USA ISSN: 1017-9909 DOI: 10.1117/1.1989987 Section 4 *Seiten 5-6; Abbildung 4*.

Ruckdeschel F. R. et al: "Yule-Nielsen effect in printing: a physical analysis", Applied Optics, Optical Society of America, US, Bd. 17, Nr. 21, Nov. 1, 1978, Seiten 3376-3383, XP002319741 ISSN: 0003-6935 *das ganze Dokument*.

* cited by examiner

METHOD FOR MAKING OVERPRINT PREDICTIONS

CROSS REFERENCE TO RELATED APPLICATIONS

This application claims the benefit and priority of EP10004328.0 filed Apr. 23, 2010. The entire disclosure of the above application is incorporated herein by reference.

BACKGROUND OF THE INVENTION

1. Field of the Invention

The present invention relates to a method for making overprint predictions.

2. Discussion

In prior art it is known that in package printing for example, a great variety of special colors are used which are combined with each other during the printing process by overprinting. From a library of thousands of special colors, a few colors to be combined are selected, for example 8 to 12 colors. In practice, this produces a great number of color sets which are different from application to application. From each such color set intermediate hues are produced by creating hue gradations using for instance a screening technique and printing these hues gradually one upon the other. Thus many combinations both of intermediate hues and color sets are totally possible.

There are different reasons for an existing need of information on the appearance of an overprint. This can be used for instance in making proof prints for true-color displaying on the monitor, for the determination of color combinations which are more favorable while having the same color effect, and so on. All this information usually relies on the CIELAB value of a color combination in printing, this value being a standardized value based upon a degree of spectral reflectance (L*a*b* color space of CIE, CIE publication 15-2004).

Considering that the appearance is also dependent on the material of the substrate, an overprint prediction could be made with highest accuracy only if all color sets with their colors in all shades and all overprint combinations were applied to the respective substrate and evaluated. Such efforts would not be economical. Nevertheless, it is one of the methods known in prior art in which hundreds of color combinations and even more have to be printed as color fields which are subsequently tabulated using measuring values obtained by spectral analysis. This measurement only determines the degree of spectral reflectance of each field as a whole, hence the combined effect of the contribution of each color component and of the printing substrate on the passage of light. Although not all overprint combinations are required, the reduction to only a few shades per individual color must be increasingly broad with an increasing volume of the color set. Including printing and evaluation, the effort for each color set is high.

A modification of such a prior art method provides for shades of the individual colors to be printed on a partly pre-treated printing substrate, i.e. on a blank substrate or on a substrate that is pre-printed in black and grey for example, the shades being used to determine the specific characteristics of the respective printing color. This method is also complicated and in particular it is comparatively inaccurate concerning the prediction as to the effect of overprinted colors.

The pre-known systems are described for example in WO 98/46008 or US 2005/0094209.

Within an improvement of the known method, US 2006/0007252 describes the use of the so-called Neugebauer model for overprint calculation. Here the spectra of the individual full tones on the one side and of the full tone overprints on the other side are used. A correspondingly improved system is disclosed in U.S. Pat. No. 7,423,778. However, the method there described still necessarily requires the measurement of several overprints, namely with respect to full tones on full tones and with respect to intermediate tones on full tones.

SUMMARY OF THE INVENTION

In view of the above-described prior art it is an object of the present invention to improve a method of this kind to that effect, that it enables more reliable overprint predictions while reducing the effort. In particular, it shall be possible with the method to react to new color combinations in a flexible manner without affecting the quality of the predictions.

The method according to the invention is initially based on the usual specifications in a printing process. These are as a rule the printing substrate on the one side and the printing colors to be used on the other side, e.g. special colors and/or usual process colors. Depending on the desired accuracy, the gradations of the hue values are determined, for example by steps of 10%, beginning at 10% until 100% (full tone). Additionally, the color combinations are predefined as data of the hue value of each of the desired n printing colors.

According to the invention, an individual color prediction is first made individually for each of the n printing colors. The same comprises three transmittance components and the associated transmittance spectra for each of the hue values.

The transmittance component in terms of the present invention is understood to be the component—which may possibly also be referred to as the component of the path—which results from the observation of the reflectance of the printing substrate itself, of the single and of the double passage through the printing field.

Thereafter, the spectral values of each hue value produced by the described printing process and of the printing substrate are determined. These values are available either in data bases or in other secured sources or are measured by spectral analysis. In this case, fields with the respective hue values are printed for each of the colors.

Figure 1:
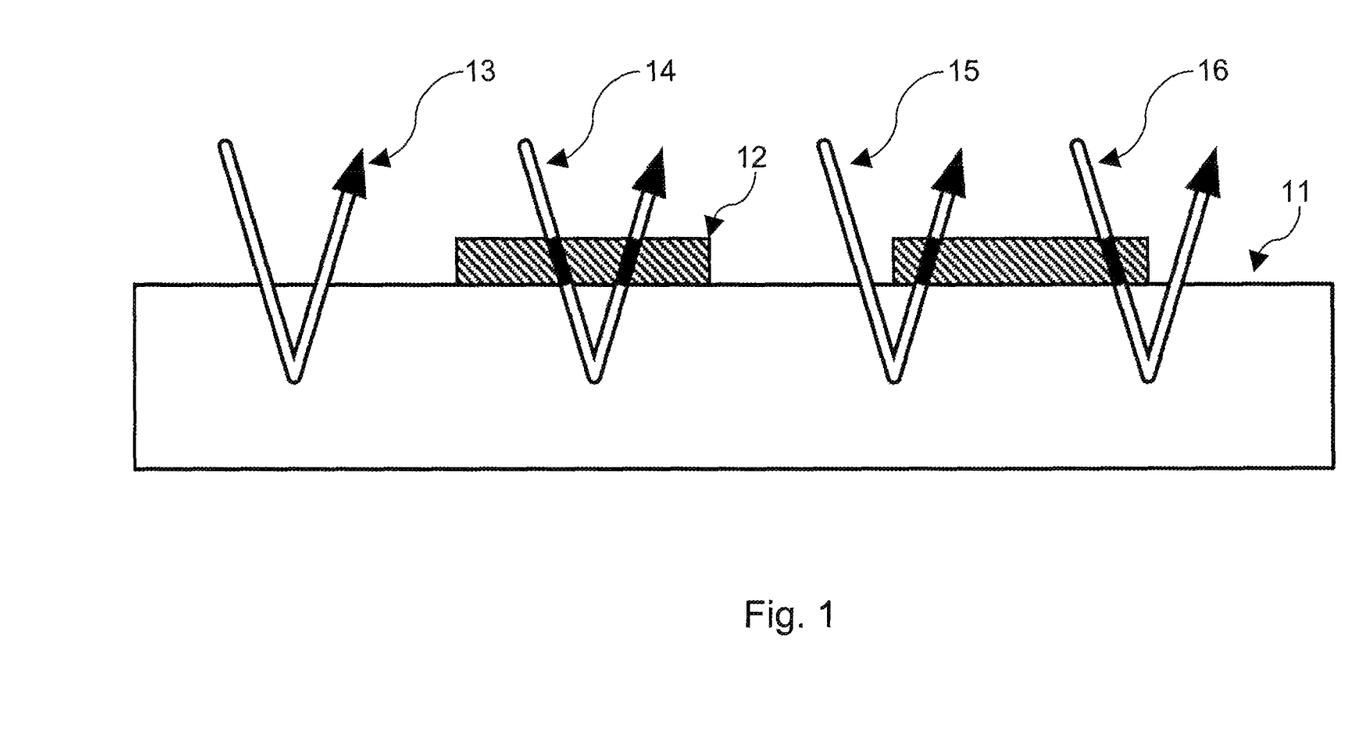
FIG. 1 a schematic illustration of the passage of light rays through a printed substrate.

FIG. 1 schematically illustrates how light passages in printed substrates can be differentiated. The specialty of the method according to the invention resides in the fact that the measuring values are subdivided into the component (13) of the blank substrate (11), the component of the single passage of light (15, 16) through the color coat (12) and that of the double passage of light (14) through the color coat (12). This takes account of the usual realistic light paths, because normally there is also a lateral scattering of light in addition to the reflection in the printing substrate. That means that a light ray is incident on a screen dot, passes through this screen dot, is reflected by the printing medium and is again reflected through the printed area and thus passes twice through the color coat, or a light ray enters through a screen dot, is scattered within the substrate and exits at an unprinted position or vice versa, which corresponds to a single passage of the light through the color coat, or finally the light ray is reflected exclusively by the printing substrate outside of screen dots. For each printed hue value the percentages of the three ways of transmission—referred to as transmittance components—are determined on the measured spectrum, with the result that the hue value of this printing color is conceived as consisting of three effective surface components (in terms of probabilities) with their three associated transmittance spectra.

Figure 2:
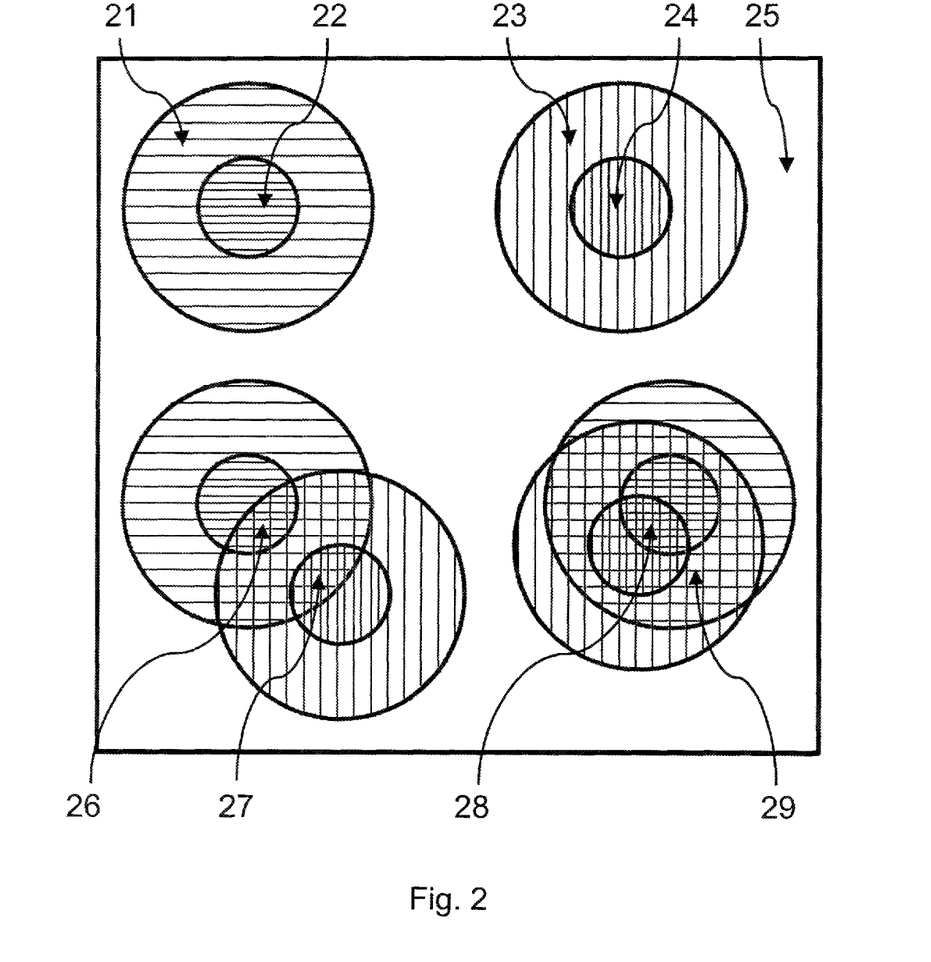
FIG. 2 a schematic illustration of the overprint relationship of two colors.

Taking this into account, several such surface segmentations can now be placed on top of each other at a given order of printing, as shown in FIG. 2. Two colors will result for example in 3×3=9 combinations of surface components. For example, there are the non-overlapping components of the single (21) and of the double (22) passage through the first color as well as the single (23) and the double (24) passage through the second color, the unprinted component (25) and the overlapping components; single passage through color 2 with double passage through color 1 (26), in the reverse order (27), double passage through both colors (28) and single passage through both colors (29).

The probability for each combination is calculated on the basis of the individual probabilities. A corresponding resulting value can be determined from the total of the contributions of all these combinations with their respective spectral transmittance behavior, and this resulting value very precisely predicts the result of the overprint on the given printing substrate.

Advantageously, the invention proposes that the individual hue values of the color combination are corrected in dependence of the substrate material. This may involve for example user specifications. Further advantageously, the invention proposes the consideration of modified hue values during combined printing, due to the influence of the other colors which are involved. Here, trappings may have influence with respect to the coat thickness.

According to a further proposal of the invention, the coat thickness of the respective color in the screen dot is considered, because it is known that depending on the screening technique and the printing technique the color coat thicknesses in the screen dot are different from those in the full area. The transmittance and possibly the scattering of the color coat thus changes relative to the full tone. This effect is dependent on the hue value and can be taken into account by process-oriented specifications or by a mathematical adjustment to measuring data.

Further within the scope of the invention, also the respective printing techniques are considered in addition to the printing order, since the selection of the printing technique (inkjet, offset, flexo printing, gravure printing) of course influences the determination of the above mentioned probability values or coat thicknesses.

Particularly advantageously, the invention proposes the individual color predictions to be determined by the following steps:
a) the degree of spectral reflectance is determined for the unprinted substrate,
b) the degree of spectral reflectance is determined for each shade of the gradation of a printing color,
c) the degree of spectral transmittance of the color coat is determined for each shade of the gradation of a printing color using the determined degree of spectral reflectance, namely both for
i) a single and
ii) a double passage of light,
d) the transmittance components of the substrate, of the single and of the double light passage are determined for each shade,
e) a prediction is made as to the reflectance spectrum for each shade based upon the determined transmittance components, the degrees of spectral transmittance and the determined degree of spectral reflectance of the substrate.

This initially mentioned advantageous way of making an individual color prediction produces very qualified reflectance spectra for the individual colors. Thus the overprint predictions which are based on these values become highly realistic and qualified.

According to an advantageous technique of the invention, the corresponding values can be normally determined by a spectrophotometrical measurement. However, sufficient measuring values are already available for many colors and they can be learnt from data bases. Moreover, it is possible in turn to fill data bases with values that have been determined in accordance with the invention.

Various techniques can be applied for the determination of the individual values. Each of the three ways has its own transmittance spectrum, i.e. its own way of filtering the light during its passage. It is only the single and the double passage which are interesting. The zero path does not filter. Its transmittance spectrum for all wavelengths=1. It is only the reflectance spectrum as an overall appearance that can be measured, in which the light proportionally travels three different paths and each of these three paths has its own filtering. The overall result is measured in reflectance. The individual components are calculated for example through physical assumptions.

For example, the degree of spectral transmittance of the color that has been passed twice can be determined on the basis of the degree of spectral reflectance of the substrate on the one side and on the basis of the full tone on the other side. For the degree of spectral transmittance of the color coat that has been passed once, the degree of spectral transmittance of the color coat that has been passed twice can be used. According to a further proposal of the invention, the degree of spectral transmittance of the color coat that has been passed once and of the color coat that has been passed twice can be corrected by the deviation of the predicted reflectance spectrum from the determined degree of spectral reflectance. In a corresponding manner, the transmittance components of the substrate, of the single and of the double passage of light can also be determined on the basis of the degree of spectral reflectance and the degrees of transmittance.

According to a further advantageous proposal of the invention, the three transmittance components of the substrate, of the single and of the double light passage are determined on the basis of a predetermined characteristic curve of the hue value and additional information on the screen and on the printing technique.

The respective technique determines the quality of the respective finally determined predictions.

According to an advantageous proposal of the invention, the values of the respective colors between the defined hue values can be completed by interpolation which, although it introduces inaccuracies into the entire system, may be sufficient depending on the individual printing job that is intended. The degree of the desired accuracy determines the degree of the screens to be selected.

Accordingly, first of all predictions comprising three transmittance components and the associated transmittance spectra for the respective hue value are determined for each of the n colors, so that their proportional mixture again accurately corresponds to the reflectance spectra of the predefined gradations of the hue values.

Although a great variety of methods are known for individual color predictions, the novelty of the method characterized in patent claim 6, which is new and inventive also independently of the overprint prediction, is that this method also involves empirical corrections. In prior art merely an independent spectrum and a geometrical surface covering are produced from which all values are derived. The reflectance spectrum is not recombined into the original value.

Since the invention describes the ink coverage realistically by means of transmittance components, changed circumstances with regard to surface covering and coat thickness in overprint can be described in an advantageous manner compared to the individual color.

In printing technology it is known that ink trapping on blank paper is different from ink trapping on printed paper (paper already printed with a different color). This is expressed in the usual trapping formulae by a change of the coat thickness or by repelling, i.e. a decreasing surface covering. This is advantageously employed in the invention.

It can also be assumed that the measurement of the surface covering of a hue value of a color is different for printed an unprinted paper. This effect is the expression of a changed surface interaction (e.g. in the form of adhering and bonding) and can be taken into account in various ways empirically as a change of the hue values in combined printing. This so-called consideration of trapping is one of the further advantageous aspects of the present invention.

It is known that colors are not perfectly transparent but scatter the light to a certain extent, i.e. deflect the light from the straight progression of the ray. Thus overprints of colors can be better described if both their transmittance and their scattering behavior are considered. The scattering behavior of a color can be determined for example by printing this color on a different color (preferably black) and by comparing the measured spectrum with a pure computation of the transmittance. Due to the scattering of the upper color, the light again reaches the outside without having reached the lower color. The result is brighter than it would have to be expected from a pure computation of the transmittance. This consideration of the so-called scattering effect also is an advantageous aspect of the present invention.

Further, the invention allows the consideration of the surface reflection. The interface between air and paper or ink reflects according to the laws of optics a part of the incident light. Thus the measuring light which is incident from outside does not fully penetrate into the medium. Also, the internally returning light is partly retained. The interpretation of the spectral measuring data using color coats can be improved if these effects are considered.

Finally, the invention also allows a consideration of the so-called covering structure. The color application is not completely homogeneous during the printing process. Particularly in offset printing the very viscous inks result in the formation of strings. The ink string tears off and becomes deposited on the paper, predominantly in the feeding direction. The surface of the paper often is much coarser than the thickness of the ink coat, which results in contact problems and in an incomplete application of ink. The incomplete covering can be described in the prediction model, e.g. by residual surface components of unprinted paper also in full tone.

The method according to the invention is comparatively simple and the effort is reduced compared to the pre-known methods, since printing and evaluation are only required to a reasonable extent, while it is possible to additionally use already known values. The spectra of the transmittance at a single and at a double passage can be determined for example using full tone fields and can be transformed to the other values. It is possible also in this case to use a smaller number of supporting points. Despite the comparatively low effort with regard to printing, spectral analysis and evaluation, the resulting overprint predictions are comparatively accurate, particularly if considering the coat thickness, the printing technique and the printing order.

BRIEF DESCRIPTION OF THE DRAWINGS

Further advantages and features of the invention will become apparent from the following description of the drawings, wherein it is shown by.

DESCRIPTION OF THE PREFERRED EMBODIMENTS

Figure 3:
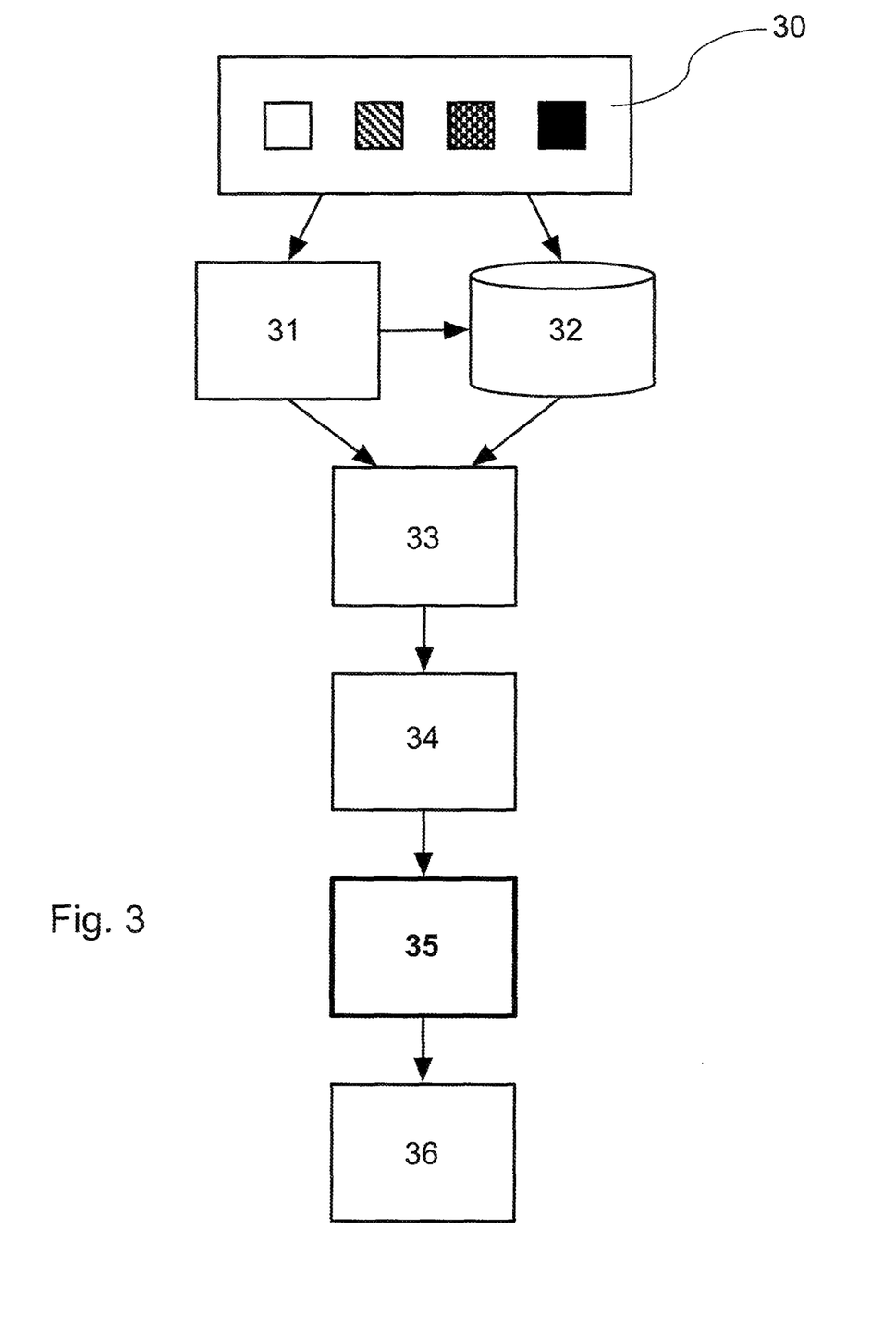
FIG. 3 a flow chart for illustrating the process of the determination of the spectral transmittance and the transmittance components.
Figure 4:
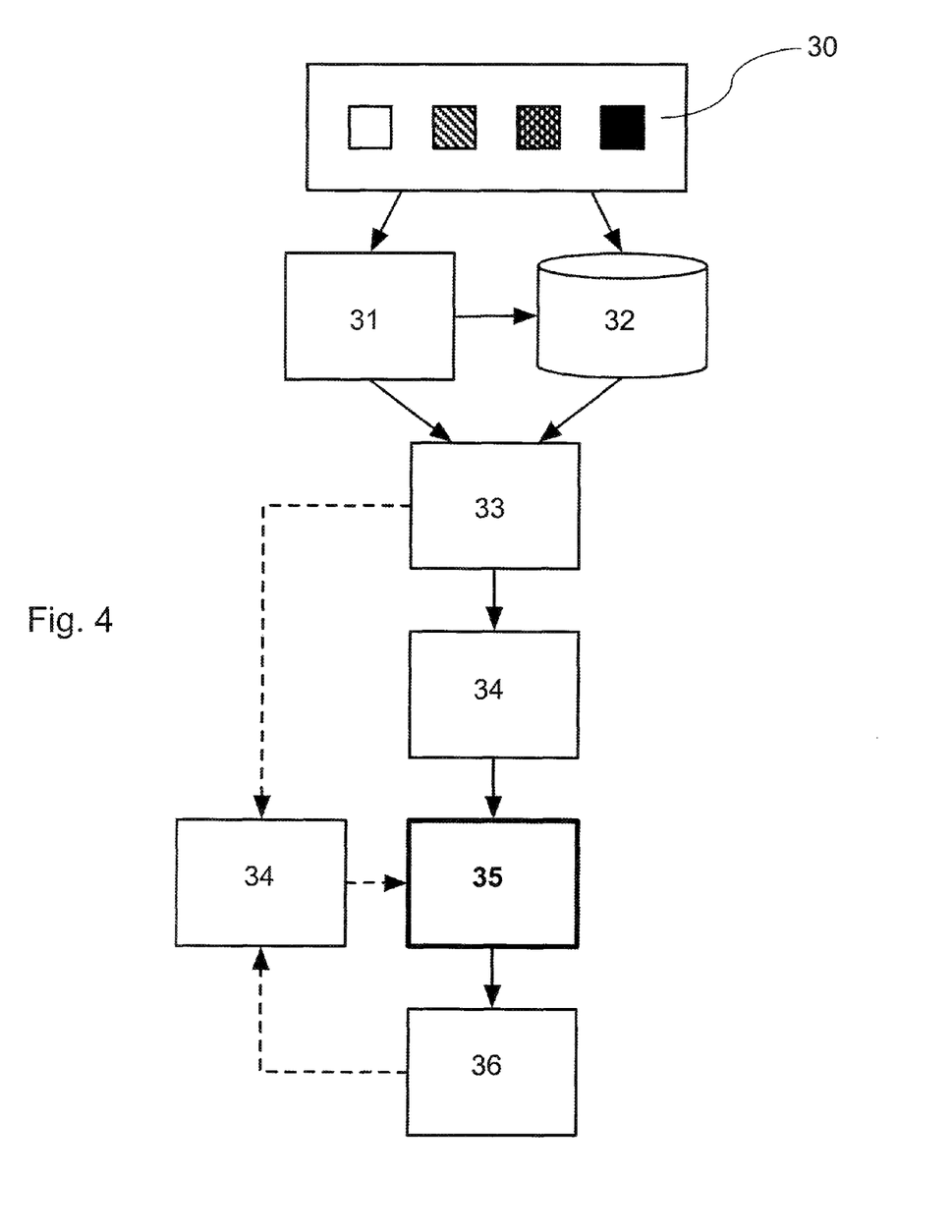
FIG. 4 a flow chart for illustrating a variant of the process according to FIG. 3.

FIGS. 3 and 4 are flow charts illustrating the process of the determination of transmittance components for printing colors. Identical steps of the process are identified by the same reference numbers in the Figures. FIG. 4 illustrates a variant of the process.

First of all, a color is printed on a substrate in different screen gradations including 0% and 100%, in a first step 30. Thereafter, the spectral reflectance both of the substrate and each printed shade of the color is determined in step 33 of the process either by measurement 31 or by look-up of the value in a data base 32. The analysis performed in step 34 serves for the determination of the spectral transmittances and their components for each shade of the color.

Thus the following information 35 is known for each shade of the respective printed color:
the spectral reflectance of the printing substrate
the spectral transmittance for the single passage
the spectral transmittance for the double passage as well as
the transmittance component of the zero passage
the transmittance component of the single passage and
the transmittance component of the double passage.

Thus it is possible in step 36 to make a prediction as to the spectral reflectance of each shade of a color on the basis of available information within the scope of a re-synthesis.

In the variant of the process illustrated in FIG. 4, a correction of the resulting values is made. The spectral reflectance both of the substrate and each shade of the color measured or obtained from the data base in step 33 of the process on the one side and the predictions as to the spectral reflectance of each shade of the color made in step 36 of the process on the other side are examined for deviations, and correction values of the respective spectral transmittances and their components for each shade of the color are determined. The same flow as a correction into the results in step 35.

Figure 5:
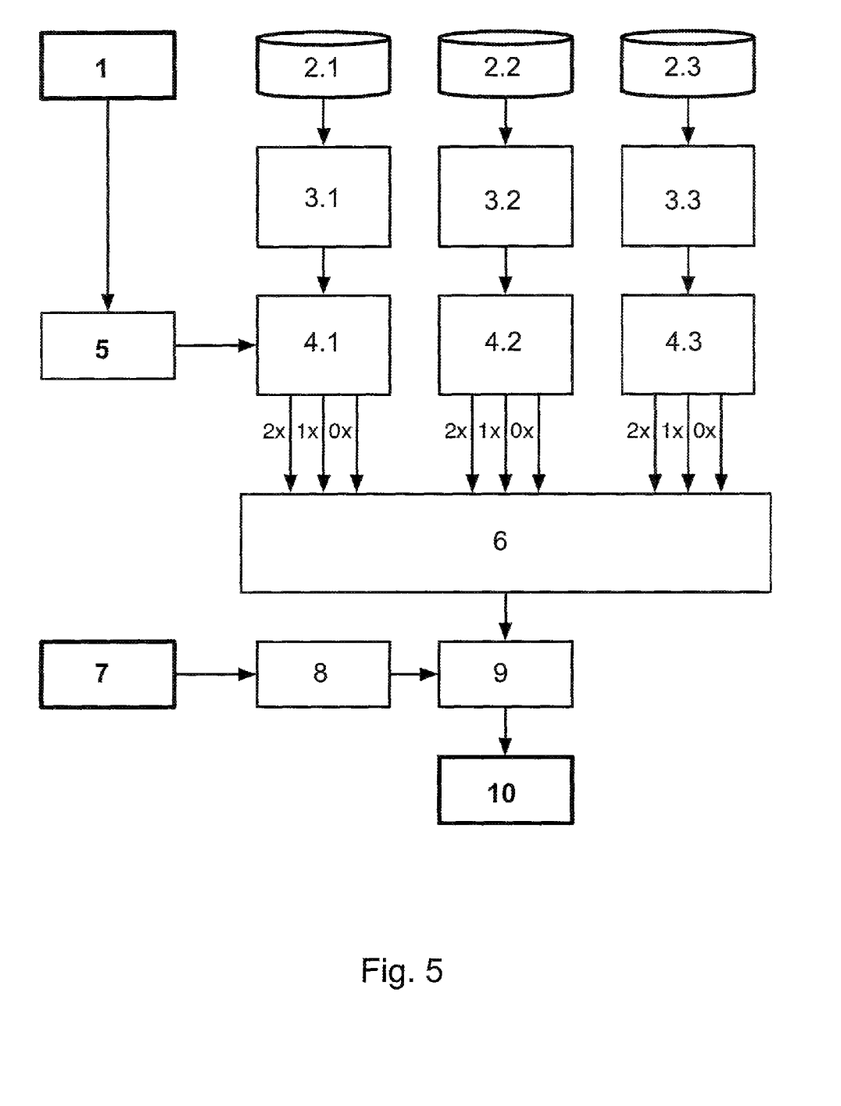
FIG. 5 a flow chart for illustrating the process of the determination of an overprint result and FIG. 6 a flow chart for illustrating supplements of the process according to FIG. 5.
Figure 6:
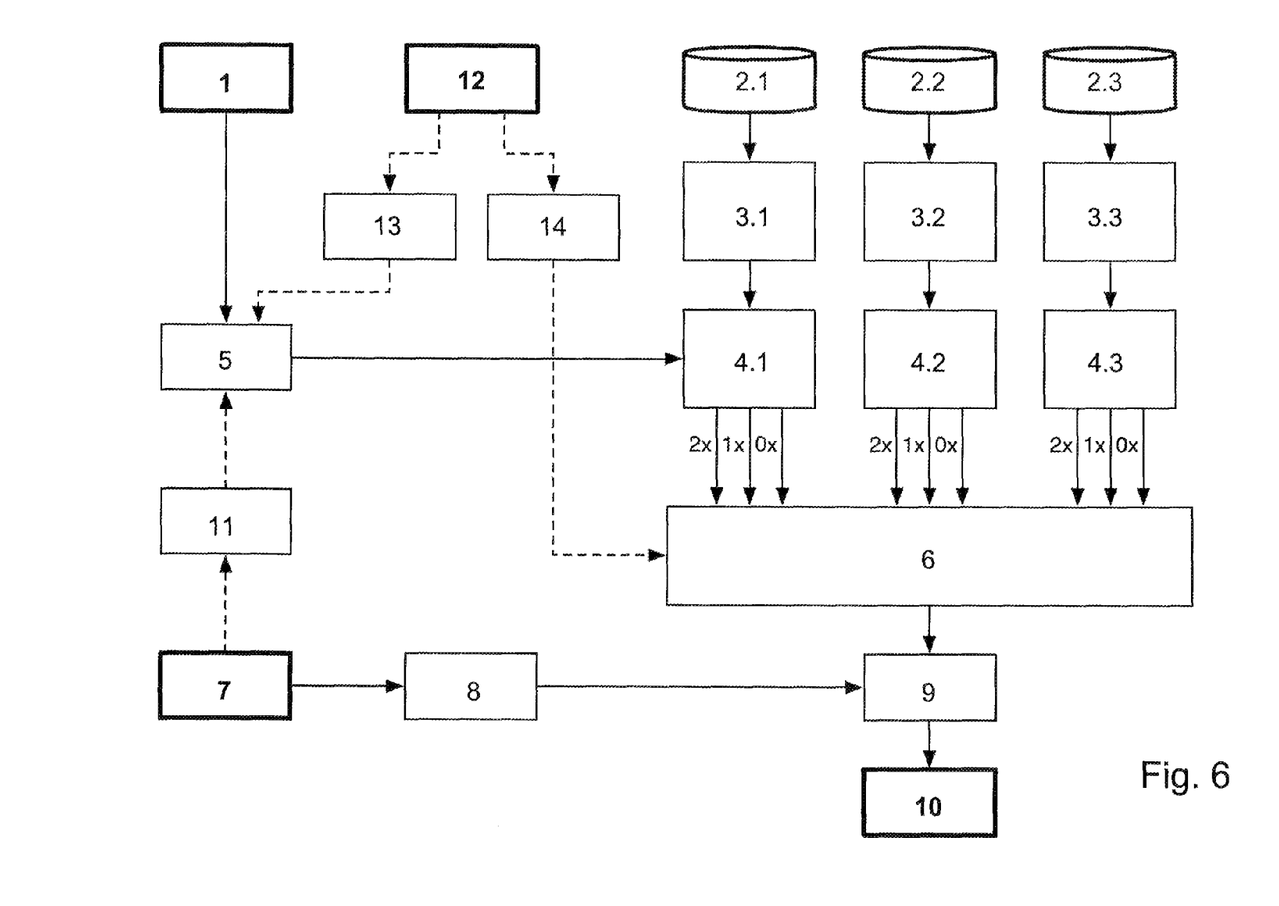

The FIGS. 5 and 6 illustrate in the manner of a flow chart the determination of an overprint prediction, with FIG. 6 showing supplements or variants of the basic process. Identical process steps are identified also in this case by identical reference numbers.

A desired color combination 1 is predefined, which flows into the data of the hue values of the n colors, step 5.

For each of the n colors 2.1, 2.2, 2.3 and so on, a respective individual color prediction is made in the steps 3.1, 3.2, 3.3 resulting in the spectral transmittance and their components for known shades. Considering the hue values of the n printing colors from step 5, the spectral transmittance and its components for the respectively desired hue value is now determined for each of the n printing colors in the steps 4.1, 4.2, 4.3 and so on. Interpolation is used for this purpose. The corresponding transmittances and their components for the zero, the single and the double passage for all printing colors 1 to n are now combined in step 6 to the (3 to the power of n) possibilities of passage in order to achieve effective transmittance spectra and possibilities for each combination by superposition of the spectral transmittances.

A further specification is the desired printing substrate 7 whose spectral reflectance is determined in step 8 or is learnt from a data base. This spectral reflectance of the printing substrate in step 8 is combined within the scope of a synthesis with all combination components and their transmittance spectra in step 9. This produces the result in step 10, namely the reflectance spectrum of the overprint of desired hue values on a desired substrate.

The different variants which result from FIG. 6 are concerned in the first instance with corrections or refinements of the method.

The determination of the printing technique and of the printing order 12 can have different effects. For example, they can lead in step 13 to changed hue values in combined printing which directly influence the data of the hue values of the n printing colors in steps 5.

Also, the specifications in step 12, i.e. the printing technique and/or the printing order, can have effects on changed coat thicknesses in combined printing 14. These results of the coat thicknesses can in turn flow directly into the correction of the spectral transmittances in step 6 of the superposition of all spectral transmittances and their components.

As a further refinement, the hue values can be corrected in dependence of the printing substrate 7 in step 11, which in turn directly influences the hue values of the n printing colors in step 5.

The embodiments described with reference to the drawing Figures are merely intended for explaining the invention in more detail and are not in any way limiting. Different combinations of the individual steps of the process are as well within the scope of the present invention as are variations of individual steps.

What is claimed is:

1. A method for making the overprint prediction for a color combination, wherein a printing substrate and at least two printing colors and one gradation of hue values including full tone for each printing color as well as color combinations are predefined as data of the hue value of each of the n printing colors, comprising:
   a) firstly, determining individual color predictions comprising three transmittance components and the associated transmittance spectra for the respective hue value for each of the n printing colors, the three transmittance components are:
      as a first component light rays being reflected on the printing substrate without passing through a printing field;
      as a second component light rays being reflected on the printing substrate with a single passage through a printing field; and
      as a third component light rays being reflected on the printing substrate with a double passage through a printing field;
   b) determining, for an intended color combination up to (3 to the power of n) combinations of the transmittance components and the associated combined transmittance spectra, and
   c) predicting an overall reflectance spectrum of an overprint on the basis of the determined transmittance components with their transmittance spectra and the reflectance spectrum of the unprinted substrate.

2. The method according to claim 1, wherein the hue values in the combination are corrected in dependence of the substrate material (e.g. by user specifications).

3. The method according to claim 1, wherein changed hue values resulting from the influence of other printing colors which are involved are considered during combined printing.

4. The method according to claim 1, wherein the printing order is determined.

5. The method according to claim 1, wherein the intended printing technique is considered.

6. The method according to claim 1, wherein individual color predictions are determined by the following steps:
   a) the degree of spectral reflectance is determined for the unprinted substrate,
   b) the degree of spectral reflectance is determined for each shade of the gradation of a printing color,
   c) the degree of spectral transmittance of the color coat is determined for each shade of the gradation of a printing color using the determined degrees of spectral reflectance, namely both
      i) for a single and
      ii) for a double passage of light,
   d) the transmittance fractions of the substrate, of the single and of the double passage of light are determined for each shade,
   e) a reflectance spectrum is predicted for each shade on the basis of the determined transmittance components, the determined degrees of spectral transmittance and the determined degree of spectral reflectance.

7. The method according to claim 6, wherein the degree of spectral reflectance is determined by printing color fields in the predefined grades of hue values on the substrate, followed by a spectrophotometrical measurement.

8. The method according to claim 6, wherein the degree of spectral transmittance of the color coat which is passed twice is determined on the basis of the degree of spectral reflectance of the substrate and of the full tone.

9. The method according to claim 6, wherein the degree of spectral transmittance of the color coat which is passed once is determined on the basis of the degree of the spectral transmittance of the color coat which is passed twice.

10. The method according to claim 6, wherein the degree of spectral transmittance of the color coat which is passed once and of the color coat which is passed twice is corrected by the deviation of the predicted reflectance spectrum over the determined degree of spectral reflectance.

11. The method according to claim 6, wherein the three transmittance components of the substrate, of the single and of the double passage of light are determined on the basis of a predefined hue value curve and data on the screen and on the printing process.

12. The method according to claim 6, wherein hue values (in the three transmittance components and/or in the transmittance spectra) between the shades are interpolated.

13. A method for predicting overprint of a color combination comprising:
   printing a color coat of plurality of different inks of different color shades on a substrate in different screen gradations including 0% and 100%;

determining spectral reflectance of both the substrate and each printed color shade by measurement or by look-up in a database;
analyzing each printed color shade to determine the following for each printed color shade
  a) spectral reflectance of the printing substrate;
  b) spectral transmittance of light passing through the color coat once;
  c) spectral transmittance of light passing through the color coat twice;
  d) transmittance component of light not passing through the color coat;
  e) transmittance component of light passing through the color coat once;
  f) transmittance component of light passing through the color coat twice;
predicting spectral reflectance of each printed color shade;
determining spectral transmittance and components for predetermined tone value for each printed color shade using interpolation;
combining to the 3 to the power of n possibilities of passage, the transmittances and components for light not passing through the color coat, light passing through the color coat once, and light passing through the color coat twice; and
predicting overall reflectance spectrum of an overprint on the basis of the determined transmittance components with their transmittance spectra and a reflectance spectrum of an unprinted substrate.

\* \* \* \* \*